May 15, 1928.
Re. 16,967
J. R. WYATT
INDUCTION FURNACE HAVING UNIDIRECTIONAL CIRCULATION
Original Filed Aug. 29, 1918 2 Sheets-Sheet 1
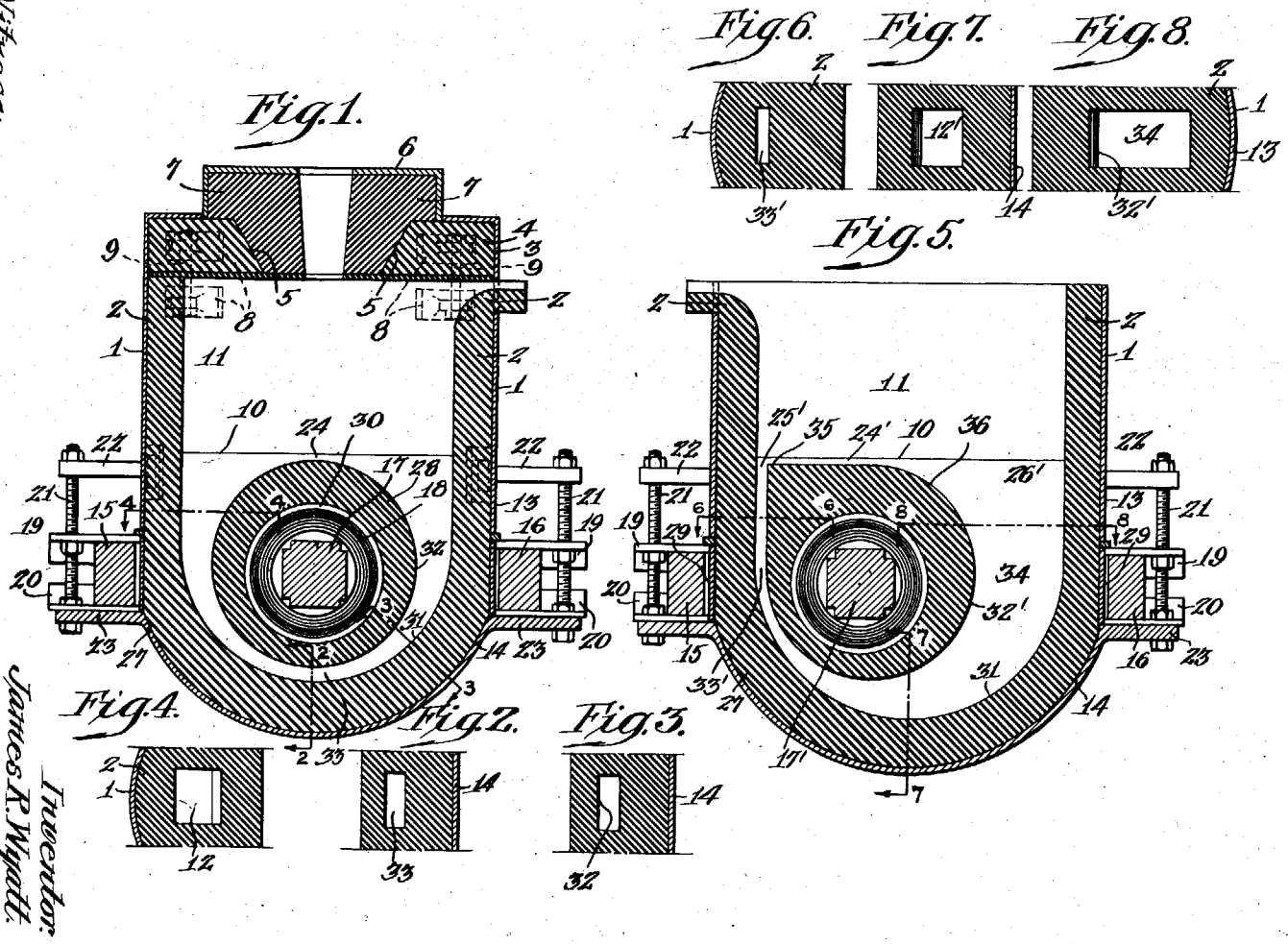
Witness:
Walter Chom
Inventor:
James R. Wyatt.
by A. Stowe Johnson
Attorney.

May 15, 1928.
J. R. WYATT
Re. 16,967
INDUCTION FURNACE HAVING UNIDIRECTIONAL CIRCULATION
Original Filed Aug. 29, 1918 2 Sheets-Sheet 2
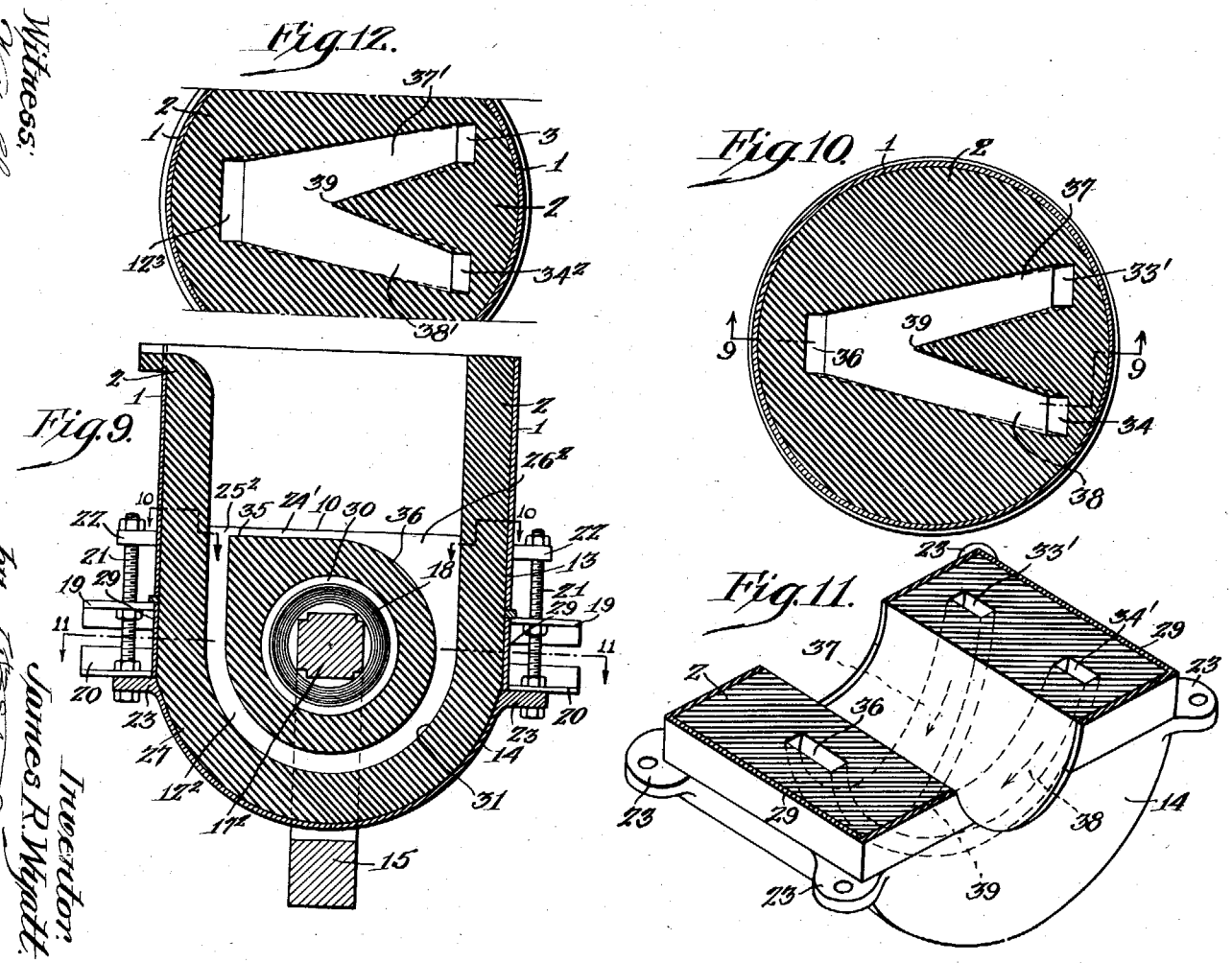
Witness:
Walter Chism.
Inventor:
James R. Wyatt.
by C. W. Steell Jackson
Attorney.

Reissued May 15, 1928. Re. 16,967

UNITED STATES PATENT OFFICE.

JAMES R. WYATT, OF CAMDEN, NEW JERSEY, ASSIGNOR TO THE AJAX METAL COMPANY, OF PHILADELPHIA, PENNSYLVANIA, A CORPORATION OF PENNSYLVANIA.

INDUCTION FURNACE HAVING UNIDIRECTIONAL CIRCULATION.

Original No. 1,312,069, dated August 5, 1919, Serial No. 251,882, filed August 29, 1918. Application for reissue filed October 26, 1922. Serial No. 597,168.

My invention relates to electric furnaces of the induction type in which motor effect or pinch effect or both are utilized in a resistor outside of the furnace chamber.

The purpose of my invention is to produce intensified action at a particular part of the resistor channel to clear the same.

A further purpose is to intensify motor effect upon one side or end of a resistor channel and to reduce the motor effect upon another side or end thereof to cause uni-directional flow.

A further purpose is to utilize the squeeze of pinch effect and the pressure of inwardly-directed motor effect to cause flow in the same direction.

A further purpose is to avoid the inconsistent tendencies to cause flow in different directions in the same part of the channel by reason of motor effect and pinch effect and to unite the movements caused thereby to cause flow in the same direction.

A further purpose is to carry out the processes and purposes indicated in the specification and the claims thereof.

I have preferred to illustrate my invention by but one representation of each of but three forms thereof which are trustworthy and reliable and which at the same time well illustrate the principles thereof.

In the drawings, Figs. 1, 5, and 9 are vertical sections of different forms of my invention, 1 and 5 being central and 9 following line 9—9 of Fig. 10.

Figs. 2–4 are fragmentary sections of Fig. 1 upon the lines 2—2, 3—3 and 4—4 thereof.

Figs. 6–8 are fragmentary sections of Fig. 5 taken on lines 6—6, 7—7, and 8—8.

Fig. 10 is a horizontal section upon line 10—10 of the structure shown in Fig. 9, following the contour of one of the resistor-channels.

Fig. 11 is a perspective section also on line 10—10 of Fig. 9.

Fig. 12 is a section corresponding to Fig. 10, but of a modified form.

I have applied my invention to the general type of vertically-placed resistor-channel induction furnaces capable of swinging about a horizontal axis to pour from a spout such as disclosed in my Patent No. 1,201,671 of October 16, 1917, though I have not included herein the angle in the channel resistor characteristic of that patent.

As in that patent, the body of the furnace is of cylindrical form, having an outer cylindrical casing 1, lined at 2 and a top shell 3, lined at 4. It is provided with a filling opening 5 and a cover 6, lined at 7 and adapted to close this opening. The body of the furnace and the top are united by brackets 8 and connecting bolts 9. For convenience the body casing is extended below the floor 10 of the furnace chamber 11 to protect the upper part of a resistor 12 beneath the chamber and for which the molten metal of the chamber provides an hydraulic head. This extension 13 is united to a lower resistor casing 14 through or about an intervening transformer frame having outer legs 15, 16 and central leg 17. The winding is shown at 18. The transformer lies between channel irons 19, 20, and bolts 21 unite the parts, engaging brackets 22 on the extension of the body and flange 23 on the channel bottom.

Across the bottom of the furnace floor I have shown a narrow groove 24 connecting the ends of the channel. This groove is for the purpose of completing the metallic secondary for the electric circuit and may be considered functionally as a part of the channel. For convenience, however, I have treated the channel ends 25, 26 as connecting directly with the metal in the chamber which is the substantial fact. The groove corresponds in width, perpendicular to the paper, with the resistor.

The resistor is quite narrow with respect to the body of the pool and contains a very small quantity of metal as compared with the metal of the furnace chamber.

In the construction of the channel, the insulating material—as asbestos paste—is rammed in the bottom as at 27 outside and at 28 inside of a form corresponding to the intended channel shape. An insulating band 29 forms the outer limit through the transformer and the inner limit is a band 30 about the primary winding.

The transformer and its parts are preferably put in place after the form (not shown) has been inserted and this form is held in position by any suitable means, while the insulating material forming the limits of the channel is rammed inside of the form, preferably by a power hammer, in order to outline the channel shape. The form is then removed in any suitable way, as by burning of readily destructible material, or by heating and subsequent melting, if it be desired to use the heat obtained therefrom to dry out and finally cinter the lining about the channel.

The resistor walls 31 and 32 in Figs. 1 and 5 are shown as curved, preferably as cylindrical but not coaxial, so that the resistor channel varies in thickness.

In Fig. 1 it will be noted that the transformer leg 17 and winding 18 are not central with respect to the inner cylindrical wall of the channel, but that their center is dropped below the center of this wall, with the intent that the transformer coupling shall be much closer to the more constricted portion 33 of the channel than to any other portion thereof.

I have found that the closeness of coupling between the transformer and a channel situated as this is with respect to it, greatly affects the virulence of the hydro-dynamic forces set up in the conductor by reason of electro-dynamic forces in the metal, considered as a conductor of electricity, and that the eccentric placing of the transformer, such as indicated, greatly increases the pressures in this constricted portion of the channel.

In this manner I have the normal advantage of whatever pinch effect would be due to the density of electric current flow in this secondary, with an increase in intensity due to the greater current flow in the secondary and the saving of loss of stray lines of force which the closer coupling produces; greatly increasing the pressure or permitting the use of a larger cross section at this point than would otherwise be permissible. The latter correspondingly reduces the friction which the fluid meets and reduces the amount of head which it is necessary to carry in the furnace chamber (i. e. above floor 10) and more quickly and effectively heats the pool.

Even where it is not necessary to have much of a body of metal in the furnace chamber to prevent pinching off of the molten secondary, it is still quite desirable to have a considerable pool in the furnace chamber, in order to pour and spare as much metal as may conveniently be done; and the greater pressures for the same section which I attain, or the same pressure with greater section, is highly advantageous in quickly heating the metal of the furnace chamber and mixing the hot metal of the resistor thoroughly with the cooler metal of the furnace pool.

It is very important for the heating of non-ferrous metals and alloys, particularly brasses, that the section of the resistor be relatively small, in order to increase the resistance of the secondary, so that a high power factor can be attained. It is for this reason that I make the resistor a narrow channel wholly outside of the furnace chamber.

In the form shown in Figs. 5–8, I have formed a constricted channel portion 33′ at the extreme left in the figure of the resistor and have given thicker channel section in the plane of the paper, as at 34, in order to emphasize the taper of the channel and with a view to producing uni-directional flow of molten metal. With this inequality of channel thickness on the two sides, the middle leg 17′ of the transformer is relatively displaced, with respect to the other legs 15 and 16 of the transformer. The displacement of the transformer middle leg with reference to the outer legs is further increased by the eccentric placing of the middle leg and its winding within the contour 36 of the interior heat,—and electric-insulating material by which the inner wall of the channel is defined. The transformer leg is shifted to the left and permissibly below the middle of this insulation, in order to increase the closeness of electromagnetic coupling between the primary and (molten) secondary at the narrower part of the (secondary) channel for the same purpose of increasing the heating effect and the hydro-dynamic force at this point as is the case in Fig. 1, where the coupling is increased at the bottom.

It will be evident that the hydro-dynamic force thus set up will tend to drive the hotter molten metal in both directions but that it will move more readily toward the larger cross section at 34, i. e., in a counter-clockwise direction in the channel.

In order to still further improve the uni-directional flow, the interior boundary of the channel is made angular at the upper left hand of the channel, as at 35, where it joins with the furnace chamber through the groove 24, and is made curved at the upper right hand, as at 36. By this construction I gain the benefit of the motor effect at the left end 25′ rendered available by the relief from motor effect at the opposite end, 26′ and still further increase the hydro-dynamic pressure in counter clockwise direction.

In the forms shown in Figures 9–12, a similar construction to that in Figure 5 is shown, so far as the right angle at one end and curved contour at the other are concerned.

The transformer is here shown as vertical and the leg $17^2$ with its winding is shown as central with respect to the interior boundary of the channel; but might obviously be displaced, if desired to improve the coupling with respect to any part of the channel.

The characteristic by which the furnace of this form differs from that of the previous figures lies in the division of the channel at an intermediate point into two branches and the use of the motor effect of the current flowing in multiple in the branches, either as an independent means to produce circulation or to assist other means for the same purpose.

The motor effect of the current flowing in series about the angle at 35 will set up electrodynamic forces in the portion 36 causing fluid movement from the points of high pressure, in the corner, (Dr. Northrup's law) to the points of lower pressure, as in Figures 5–8. Again, the flow of the electric current along the branches 37 and 38 in multiple will set up motor effect in them which will press the metal toward the adjoining sides of the branches. Here also, according to Dr. Northrup's law, there will be fluid movement from the points of higher pressure, close to the junction 39 of the branches, toward the points of lower pressure 33′, 34′. Both of these movements are in the same direction—counter clockwise—causing uni-directional flow.

The flow can be materially helped by pinch if desired by constricting the cross section at the left as compared with that toward the right. I show both tapered channels 37′, 38′ and straight, of liberal cross section at $12^3$ (Figure 12) at the inlet as an extreme, in which the hydrodynamic stresses here too popularly summarized as "pinch effect" would tend to oppose the counter-clockwise fluid flow; and the other is relatively constricted in the single channel position, increasing the pinch tendency to move the metal in counter-clockwise direction. These indicate the flexibility of the construction to carry out the plans of the designer, helping uni-directional flow by pinch, hindering by it, or helping in one part of the circuit and hindering in another by using the pinch to squeeze the molten metal out of both ends of the channel circuit.

In operation, the motor effects from the angular connection with the pool at the left and from the division of the current both operate in counter clockwise direction and this uni-directional flow is helped by any pinch which is present.

As the general formula for the pinch indicates that it increases with the total current in the section considered, and the total current in each branch will be but half of the current in the single section, the pinch will normally be greater in the single channel portion than in the branches, assisting in the counter-clockwise direction of flow of molten metal unless offset by relative increase in the section of the undivided channel part.

Having thus described my invention, what I claim as new and desire to secure by Letters Patent is:

1. In an induction furnace, walls forming a furnace chamber, a transformer leg beneath the chamber, a winding therefor and a resistor channel for molten metal beneath the furnace chamber and connected therewith to enclose the winding, the channel being of restricted cross section, of greatest restriction at one relatively short length of the channel and nearer to the winding at the most restricted section than at other adjacent parts thereof.

2. In an induction furnace, walls forming a furnace chamber and a resistor channel for molten metal below the floor of the chamber, the latter having variant channel sections and the smallest section of short length at the bottom, in combination with an alternating current transformer having one leg thereof threaded through the resistor and closer to the metal at the bottom than at the sides of the transformer leg and a coil upon this leg within the channel.

3. In an electric furnace, walls forming a furnace chamber and a resistor channel beneath the furnace chamber, connected therewith and having a curved outer wall and a curved inner wall eccentric to the outer wall forming a channel of wedged section and curved inner and outer boundaries, in combination with a transformer having one leg threaded through the resistor and eccentric to both the outer and inner walls.

4. In an induction furnace, walls forming a furnace chamber and a resistor channel connected therewith, having its smallest section at one side of the furnace, in combination with a transformer having one leg threaded through the resistor channel and nearer to the molten metal at the side of smaller cross section than to the molten metal in the opposite side thereof.

5. In an induction furnace, walls forming a furnace chamber and a resistor channel therebeneath of approximately rectangular cross section having one side of much smaller cross section than the other and longitudinally curved inner and outer contours, in combination with a transformer threaded through the resistor channel.

6. In an induction furnace, walls forming a furnace chamber and a resistor channel therebeneath having one side of much smaller cross section than the other and curved inner and outer contours, in combination with a transformer threaded through the resistor channel, and having the leg of the transformer threaded through nearer to the metal of the side of smaller cross section than to the metal at the opposite side thereof.

7. In an electric furnace, walls forming a furnace chamber and a resistor channel therebeneath, the chamber having angular connection with the channel at one terminal thereof and curved connection therewith at the opposite terminal thereof, in combination with a transformer having one leg threaded through the resistor and a winding upon that leg.

8. In an electric furnace, walls forming a furnace chamber and a channel connected therewith at opposite ends and lying beneath the chamber, the connection at one end being more obtuse than that at the other end, in combination with a transformer having one leg threaded through the channel and nearer to the channel on the side in which the connection is less obtuse than to the channel on the opposite side.

9. In an electric furnace, walls forming a furnace chamber and a channel connected therewith tapering from one side toward the other and having more obtuse connection with the chamber above on the side of larger section, in combination with a transformer having a leg passing through the channel.

10. In an electric induction furnace, walls forming a furnace pool and a channel communicating therewith, having curved inner contour at one point of communication with the pool and angular contour at the other point of communication therewith, and a transformer passing through the loop of the channel.

11. In an electric induction furnace, walls forming a furnace pool and a channel of general curved inner longitudinal contour communicating with the pool, but having an angular connection at one point of communication with the pool, forming an edge on the inside substantially straight in a transverse direction the channel varying in cross section from a small section adjoining the angular connection with the pool to a larger section at the opposite connection therewith, in combination with a transformer threading the loop of the channel.

12. In an induction electric furnace, walls forming a furnace pool and a channel communicating therewith, of general trumpet section in longitudinal section, the smallest section of the trumpet being at one point of communication with the pool and the flare at the other resulting in different angles of inner wall connection with the pool at the two ends, in combination with a transformer passing through the channel.

13. An induction electric furnace having a channel connected with the pool, in longitudinal section of general trumpet shape, the channel having angular connection with the pool at the constricted portion of the trumpet and interiorly curved connection with the pool at the other point of connection therewith.

14. In an electric furnace, walls forming a furnace chamber and a channel connected therewith tapering from one side toward the other and having more obtuse connection with the molten metal above on the side of larger section, in combination with a transformer having a leg passing through the channel, said leg lying nearer to the channel portion of smaller cross section than to that of larger cross section.

15. In an induction electric furnace, walls forming a furnace pool and a channel beneath the pool communicating with it at opposite sides of the pool, the inner boundary of the channel being of generally curved longitudinal section throughout the greater part of the channel, in combination with a vertical division wall extending in a direction longitudinally of the length of the channel dividing the channel into substantially duplicate parts.

16. In an induction electric furnace, walls forming a furnace pool and a channel communicating with the pool and having a smaller cross section at one side of the channel where it communicates with the pool than at the other, the point of communication with the pool having the smaller cross section being also farther from the center of the pool than the other.

17. An induction electric furnace having a channel connected with the pool and of general trumpet shape, restricted at one side thereof and flared at the other side thereof, in combination with a transformer threaded through the loop of the channel and, where it passes through the loop, nearer to the constricted portion than to the flared portion.

18. An induction electric furnace having a channel loop connected with the pool thereof, of constricted section relatively at one portion thereof to produce pinch effect and having angular connection with the pool to produce motor effect in combination with a transformer threaded through the channel loop nearer to the metal at the constricted section than to that in other channel parts to emphasize pinch effect.

19. An induction electric furnace having a pool and a channel loop below the pool bifurcated intermediate the length of the channel and connecting with the pool at an angle at the single end of the channel.

20. An induction electric furnace having a bifurcated channel, the divided ends being nearly parallel.

21. In an electric furnace, walls forming a furnace chamber and a channel for a molten metal resistor lying therebelow and connecting with the channel at its ends, the resistor having more points of connection with the channel at one end than at the other.

22. In an electric furnace, walls forming a furnace chamber for molten metal, in combination with walls forming a channel connecting with the chamber at both ends, divided beneath the chamber and the divisional parts slightly diverging.

23. An electric induction furnace having a channel with a single point of connection of the channel with the pool at one end adapted to give more pinch pressure there as compared with the rest of the channel, and divided to form two connections with the channel at the other end.

24. In an electric induction furnace, walls forming a furnace pool and a channel communicating therewith and having curved inner contour at one side and angular inner contour at the opposite side where it communicates with the pool, dividing between these points, in combination with a transformer threading the loop of the channel and a transformer winding within the loop.

25. An induction electric furnace having a pool and a bifurcated channel loop beneath the pool and having a channel cross section less at the single part of the channel than the sum of the bifurcated parts.

26. In an electric furnace, walls forming a furnace chamber and a channel connecting at opposite ends with the chamber, branched intermediate the channel length, the parts from the branch spreading away from each other as they approach the pool and proportioned to yield a greater pinch pressure in the single portion of the channel than in the branches.

27. An induction electric furnace having a channel making an abrupt turn with respect to the pool at one end to produce motor effect, diverging at an intermediate point to obtain electric current generally in the same direction there for further motor effect, and relatively constricted at the single end with respect to the bifurcated end to produce pinch movement of molten metal from the single end toward the double end thereof.

28. The method of augmenting the circulation of molten fluid in an induction electric furnace of the channel type having a molten resistor secondary which consists in connecting the channel with the furnace pool at one end along angular lines and at the other end along curved lines.

29. The method of emphasizing the circulation of molten fluid in an induction electric furnace of the channel type having a molten resistor secondary which consists in increasing motor effect at one end of the channel as compared with the other and relatively enlarging the section of the secondary electric current path as the current extends toward the other end thereof.

30. The method of emphasizing the circulation of molten fluid in an induction electric furnace of the channel type having a molten resistor secondary which consists in increasing the pinch effect of the current in a portion of the channel by bringing the portion of the transformer threaded through the resistor nearer to the resistor side at that portion of the resistor than to other portions thereof.

31. The method of augmenting the circulation of molten fluid in an induction electric furnace of the channel type having a molten resistor secondary which consists in concentrating the electric current at a portion of the resistor where motor effect would occur by bringing the interthreaded part of the transformer closer to the resistor side there than at other portions thereof.

32. The method of augmenting the circulation of molten fluid in an induction furnace of channel type having a body of metal forming a pool and a molten generally cylindrical channel secondary connected with the pool and having a primary winding extending within the channel which consists in unbalancing the electro-magnetic force of the primary with respect to the nearer channel walls to provide in the channel and along flow lines thereof, progressive decrease in electro-magnetic field from the primary to affect the metal within the nearer part of the secondary more than that within the further part thereof and thus cause circulation of the metal.

33. The method of augmenting the circulation of molten fluid in an induction electric furnace having a body of metal forming a pool, a channel of generally cylindrical contour connected therewith from beneath and a transformer leg and a transformer winding entering the space within the channel, which consists in displacing the transformer winding with respect to the adjoining wall of the channel on the side toward which displacement takes place to cause unbalanced reaction of the current in the primary winding upon the metal of the channel as a secondary.

34. The method of augmenting the circulation of molten fluid in an induction electric furnace of the pool-and-channel type having the primary winding encompassed by the channel which consists in concentrating the electromagnetic effect of the current in the primary winding at one part of the adjoining side of the channel as compared with another part of the adjoining side thereof to produce movement of the metal within the channel.

35. The method of augmenting the circulation of molten fluid in an induction electric furnace of the pool-and-channel type having the primary winding encompassed by the channel which consists in bringing that portion of the primary having maximum electromagnetic effect closer to the walls of the molten secondary at one adjoining side of the channel than to the opposite part of the channel.

36. The method of producing unidirectional flow of molten metal in an electric induction furnace of a type in which a metal-holding chamber is in fluid communication with a resistor of molten metal wherein heat is generated, such resistor having a substantially rectangular cross-section in a plane normal to the direction of current flow, which consists in so displacing a primary winding with respect to a position of perfect symmetry that its electromagnetic action on the molten secondary nearest to its central coil and in line with its displacement is greater in one direction than in the opposite direction.

37. The method of producing circulation of molten metal in an electric furnace of the induction type consisting of a transformer iron core, a primary winding, a secondary closed loop of molten metal substantially rectangular in cross-section normal to the direction of current flow in the secondary, and a metal-holding chamber in fluid communication with the secondary, which consists in taking advantage by an unsymmetrical location within the secondary loop of the primary winding with respect to the nearer metal, of the established law that variation in magnitude of electrodynamic forces within different parts of the length of the molten conductor free to move in the direction of its length will cause such motion.

38. The method of developing forces to cause a circulation of molten electrically conducting fluid in an electric induction furnace of a type in which a metal-holding chamber is in fluid communication with a fluid resistor of substantially rectangular cross-section for a plane which cuts said resistor normal to the direction of electric current-flow, which consists in so disposing a primary winding on an iron core that transformer lines of magnetic force produce a field of force in which said resistor is unsymmetrically located with respect to the nearer metal along the line of dissymmetry.

39. The method of emphasizing the circulation of molten fluid in an electric furnace of the channel type which consists in providing motor effect at one end of the channel by forming an angular connection of the channel with the pool at that point and relieving from reverse motor effect at the other end of the channel by there relatively obtusing the connection with the pool.

40. The method of emphasizing the fluid circulation of molten metal in an induction electric furnace of the channel type which consists in constricting the resistor in one part, gradually enlarging its section adjoining the constricted portion, and threading the transformer through the resistor closer to the metal at the constricted portion than at the less constricted portions thereof.

41. The method of emphasizing fluid circulation of molten fluid in an induction electric furnace of the channel type which consists in forming an angular connection of the resistor with the pool at one end, placing the portion of the transformer threaded through the resistor loop nearer to the metal in the resistor in proximity to this end than at other parts of the resistor and enlarging the resistor as it approaches the other thereof.

42. The method of emphasizing the circulation of molten fluid in an electric furnace of the channel type which consists in providing motor effect at an intermediate portion of the resistor by bifurcating the resistor there, causing the electric current to travel in nearly parallel slightly diverging lines at that point and relieving against motor effect at the end of the bifurcated portion of the resistor by there relatively obtusing the connection of the resistor with the pool.

43. The method of emphasizing the circulation of molten fluid in an electric furnace of the channel type which consists in providing motor effect by two different means at two different angles formed in the secondary path, causing the induced electric current to travel in series about one angle and in multiple in branches about the angle at different positions in the same secondary length.

44. The method of emphasizing the circulation of molten fluid in an electric furnace of the channel type which consists in concentrating motor effect at two considerably spaced points in the length of the resistor to produce circulation in the same direction within the resistor.

45. The method of emphasizing the circulation of molten fluid in an electric furnace of the channel type which consists in concentrating motor effect at the pool entering end of the resistor and at a point intermediate the length of the resistor to produce molten flow in the direction of the outlet end thereof.

46. The method of emphasizing the circulation of molten fluid in an electric furnace of the channel type which consists in providing motor effect by two different means, causing the induced electric current to travel in series about one angle and in multiple in branches about another angle at different positions in the same resistor length and relieving against motor effect at the end of the branches, there relatively obtusing the interior surfaces of the connection of the resistor with the pool.

47. The method of emphasizing the circulation of molten fluid in an electric furnace of the channel type which consists in causing motor effect by the character of connection of one end of a resistor with the pool, at the same time that counter motor effect is relatively reduced at the opposite end, and increasing the pinch to produce circulation in the same direction by relatively contracting the cross section of the resistor in proximity to the first named end of the resistor.

48. The method of securing unidirectional flow of molten metal in an induction electric furnace channel which consists in providing a motor-effect drive at the entering end of the channel by series flow of electric current about an angle, applying pinch effect to the content to produce flow by enlarging the cross section of the channel toward the other channel end and applying motor effect at an intermediate point by dividing the channel and passing the electric current in parallel along slightly diverging branches thereof.

JAMES R. WYATT.